Sept. 15, 1931.  M. BIRKIGT  1,823,781
TEMPERATURE COMPENSATED VALVE
Filed Dec. 19, 1928
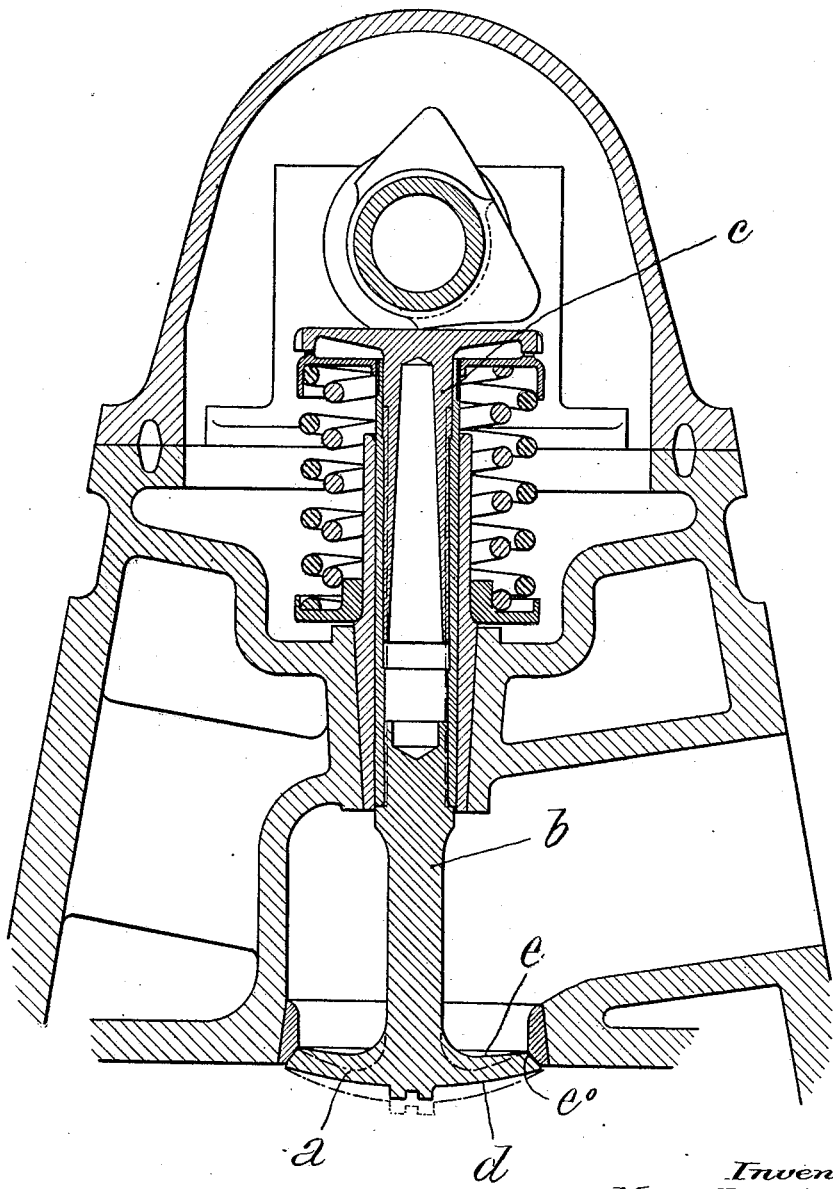
Inventor:
Marc Birkigt,
Att'y.

Patented Sept. 15, 1931

1,823,781

UNITED STATES PATENT OFFICE

MARC BIRKIGT, OF BOIS COLOMBES, FRANCE

TEMPERATURE COMPENSATED VALVE

Application filed December 19, 1928, Serial No. 327,151, and in Belgium October 6, 1928.

The present invention relates to temperature compensated valves for internal combustion engines.

One of the objects of the invention is to provide a valve head which, on heating, will change its form to compensate for variations in the length of the valve stem.

Other objects will appear in the course of the detailed description now to be given with reference to the accompanying drawing, in which the single figure represents a section through one illustrative embodiment of the invention.

Referring to the drawing there is shown a valve head $a$ formed integrally with a stem $b$ and a tail-piece $c$ threadedly engaging with the latter. Element $c$ contacts with a camshaft of convenient design and communicates its movement to stem $b$ and head $a$.

Temperature compensation is obtained by giving head $a$ a "mush-room" form i. e. so that external surface $d$ is convex, while internal surface $e$ is concave. Preferably, surfaces $d$ and $e$ are, at least, in part, spherical and of different radius.

The manner in which temperature compensation is effected is as follows: Inasmuch as the periphery of the valve head contacts intermittently with the cooled valve-seat, the center of the head, during operation of the motor, becomes hotter than the periphery and as a consequence expands so as to increase the curvature of surfaces $d$ and $e$ (dotted line position); but since, at the same time the stem-tail assembly $b$, $c$ increases in length, the total result is to maintain the cam-contacting plate forming part of tail $c$ at a constant distance from the axis of the cam shaft. The "mush-room" form of valve-head will therefore assure perfect contact of the valve-seat and its valve irrespective of variations in length of the valve-stem.

What I claim is:—

1. In a motor provided with an rotatable cam and a valve seat, a valve adapted to co-act with said valve seat and to be actuated by said cam, said valve comprising a stem portion, and a head portion limited by a concave surface on the stem side thereof and a convex surface on the side opposite to the stem side, said stem and head portions being proportioned so that the edge of said head portion remains at a substantially constant distance from the axis of rotation of said cam throughout the normal range of temperature variation of the valve and of the motor elements coacting therewith.

2. In a motor provided with a rotatable cam and a valve seat, a valve adapted to co-act with said valve seat and to be actuated by said cam, said valve comprising a stem portion, and a head portion, the stem side of said head portion being concave, and the side opposite the stem being convex, the radii of curvature of said sides being unequal, and said radii and stem portion being so proportioned that the edges of said head portion remain at a substantially constant distance from the axis of rotation of said cam throughout the variations in temperature of the valve and of the motor elements.

3. In a motor provided with a rotatable cam and a combustion chamber having a valve seat formed in the wall thereof, a valve mounted to co-act with said valve seat and limited in its outward movement thereby, said valve having a head portion limited by a concave surface on the side removed from the combustion chamber and a convex surface on the side facing the combustion chamber, and means operative by said cam to actuate said valve, said means comprising a contacting element for said cam, said means being connected to said valve so that said contacting element be spaced a predetermined distance from the axis of rotation of said cam during a portion of the rotation thereof when said valve is at its limit of outward movement, the head portion of said valve and said last-named means being proportioned so that said predetermined distance is automatically maintained substantially constant throughout the normal range of operating temperatures.

In testimony whereof I have signed this specification.

MARC BIRKIGT.